United States Patent [19]

Hoshi

[11] Patent Number: 5,079,656
[45] Date of Patent: Jan. 7, 1992

[54] MAGNETIC DISC MOUNTING ARRANGEMENT HAVING A SINGLE BEARING WHICH ROTATES A SPINDLE WITH HIGH ROTATIONAL ACCURACY AND PLANARITY

[75] Inventor: Akio Hoshi, Chichibu, Japan

[73] Assignee: Canon Denshi Kabushiki Kaisha, Saitama, Japan

[21] Appl. No.: 425,927

[22] Filed: Nov. 8, 1989

Related U.S. Application Data

[60] Division of Ser. No. 299,793, Aug. 4, 1988, Pat. No. 4,887,175, which is a continuation of Ser. No. 879,065, Jun. 26, 1986, abandoned.

[30] Foreign Application Priority Data

Jul. 1, 1985 [JP] Japan .................. 60-142507
Aug. 15, 1985 [JP] Japan .................. 60-178633

[51] Int. Cl.[5] .............................. G11B 17/02
[52] U.S. Cl. ..................... 360/99.08; 360/99.04
[58] Field of Search .............. 360/99.05, 99.04, 99.12, 360/99.08, 99.11, 98.07, 98.08; 369/270, 271, 261

[56] References Cited

U.S. PATENT DOCUMENTS 3,587,074 6/1971 Angle ........................ 260/99.12 X
4,737,948 4/1988 Okita ........................ 360/99.05 X Primary Examiner—Andrew L. Sniezek
Attorney, Agent, or Firm—Spencer & Frank

[57] ABSTRACT

A disc driving unit is arranged so that a spindle for rotating a disc member, a pulley coupled to the spindle to transmit a rotational force to the spindle, and an inner or outer ring of a bearing to support the spindle rotatably are formed integrally. This arrangement greatly reduces a number of components in the unit so that the assembly process can be greatly simplified. Moreover, the error during assembly can be kept small. Furthermore, the bearing is disposed inside the rotating plane of the spindle, so that the rotational accuracy and planarity of the spindle are improved, and the overall height of the unit can be minimized.

11 Claims, 3 Drawing Sheets

PRIOR ART

MAGNETIC DISC MOUNTING ARRANGEMENT HAVING A SINGLE BEARING WHICH ROTATES A SPINDLE WITH HIGH ROTATIONAL ACCURACY AND PLANARITY

REFERENCE TO RELATED APPLICATIONS

This is a division of Ser. No. 07/229,793 filed Aug. 4, 1988, now U.S. Pat. No. 4,887,175, which is a continuation of Ser. No. 06/879,065 filed June 26, 1986, now abandoned.

BACKGROUND OF THE INVENTION

1. Field of the Invention

The present invention relates to a disc driving unit, and more particularly to a disc driving unit that has a spindle for rotating a magnetic disc or similar disc member.

2. Description of the Prior Art

In general, a disc driving unit such as a magnetic disc driving unit applied to a magnetic disc apparatus for recording and/or reproducing an information on and/or from a magnetic disc as a magnetic recording medium has a spindle for rotating a disc member, a pulley connected to this spindle for transmission of a rotating force and a bearing which rotatably supports the spindle.

FIG. 1 shows an example of a conventional magnetic disc driving unit. In FIG. 1, reference numeral 1 denotes a base of the magnetic disc apparatus. The base 1 has a recess portion 1a formed with a shape of a deep plate and a cylindrical portion 1b connecting with a bottom of the recess portion 1a.

A spindle 2 is rotatably disposed in the recess portion 1a, and clamps a magnetic disc (not shown) with a member such as a center cone. A shaft 2b of the spindle 2 is rotatably supported by the cylindrical portion 1b through bearings 3a and 3b.

A round recess 2a is formed on the upper edge of the spindle 2.

The bearings 3a and 3b are formed as ball bearings holding steel balls between their outer and inner rings. The upper side bearing 3a is fixed to the cylindrical portion 1b of the base 1 by press fitting or adhering the outer ring to the portion positioned by a cir-clip or a retaining ring 5 which is inserted into the groove 1c formed on the inside surface of the cylindrical portion 1b. The outer ring of the lower bearing 3b is attached to the cylindrical portion 1b so as to move up and down with an extremely small clearance with respect to the cylindrical portion 1b.

In the space between the upper and lower bearings 3a and 3b are disposed a spacer 6 and a belleville spring 7.

Reference numeral 4 denotes a pulley for transmitting a rotation to the spindle 2. The pulley 4 has a recess 4a and the cylindrical portion 1b is positioned in the recess 4a. The pulley 4 has a boss 4b that couples with the inner ring of the bearing 3b in the central portion of the recess 4a.

A screw 9 is attached to this boss 4b. The screw 9 screws into the shaft 2b of the spindle 2 so that the spindle 2 and the pulley 4 are formed into a single integrated structure.

Reference numeral 8 denotes a belt, which forms a connection between a drive source not shown and the pulley 4 so as to transmit a rotation.

The screw 9 aligns the center of rotation of the spindle 2 and the pulley 4. The bearing 3b is positioned through the spacer 6 and is applied an initial pressure by the belleville spring 7 so that a gap in the diametrical direction of the bearings 3a and 3b is eliminated, and a run-out of the rotation of the spindle 2 is kept to a minimum.

When the drive source (not shown) is activated, the pulley is rotated via the belt 8 so that the spindle 2 which is integrated with the pulley 4 rotates and the magnetic disc is rotated.

In this type of conventional disc driving unit, however, because the bearings 3a and 3b support a shaft 2b with a diameter smaller than the spindle 2, if there is any play in the bearings 3a and 3b, this play increases on the spindle 2 during rotation. Consequently, it is not possible to provide high accuracy or high planarity in the rotation of the spindle.

To prevent the play, it is necessary to mount the bearings and other components with an extremely small mounting error. Consequently, all components must have high accuracy.

Moreover, conventional disc driving units have a large number of components so that each component requires much greater accuracy, and a larger number of assembly steps are also required. This meant that conventional disc driving units had the disadvantage of high manufacturing costs.

Furthermore, since an overall thickness of an unit is determined by the thickness of components, an arrangement like the conventional unit having a large number of components has the disadvantage that it is extremely difficult to keep the unit slim.

Furthermore, the bearings 3a and 3b are disposed underneath the spindle 2 so that the overall height of the unit is increased, further hindering a slim design.

SUMMARY OF THE INVENTION

It is, therefore, an object of the present invention to eliminate the disadvantages of a conventional arrangement.

It is another object of the present invention to provide at low cost a disc driving unit having an arrangement that can rotate a spindle with high rotational accuracy and planarity.

It is a further object of the present invention to provide a disc driving unit so arranged that the number of its components and the number of assembly steps is low.

It is a still further object of the present invention to provide a slim disc driving unit.

In the first aspect of the present invention, a disc driving unit comprises:

a spindle for rotating a disc member;

a first bearing element of a bearing formed integrally with the spindle; and a second bearing element of the bearing disposed on a base of the unit opposite to the first bearing element and engaged with the first bearing element.

Here, rolling members may be interposed between the first and the second bearing elements, so that the bearing may be in the form of a rolling bearing. The spindle may be a cylindrical member, and the first bearing element may be formed on an outer surface of the cylindrical member in the form of an inner ring having a race surface engaging with the rolling members. The spindle may be a hollow cylindrical member, and the first bearing element may be formed on a surface of a hollow portion of the hollow cylindrical member in the form of an outer ring engaging with the rolling members.

The disc driving unit may further comprise a center cone having an engaging surface engaging with the spindle for positioning and holding the disc. The radius of the first bearing element may be substantially equal to or greater than a radius of the engaging surface of the center cone.

In the second aspect of the present invention, a disc driving unit comprises:

a spindle for rotating a disc member;

a first bearing element of a bearing formed integrally with the spindle;

a second bearing element of the bearing disposed on a base of the unit in an opposite attitude to the first bearing element and engaged with the first bearing element; and a pulley for winding a belt member co-operatably disposed on the spindle so as to transmit a rotation of a motor.

Here, the pulley may be formed integrally with the spindle on an outer surface of a cylindrical member. The pulley and the spindle may be securely integrated.

A disc driving unit may further comprise a center cone having an engaging surface engaging with the spindle for positioning and holding the disc. The radius of the first bearing element may be substantially equal to or greater than a radius of the engaging surface of the center cone.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 2:
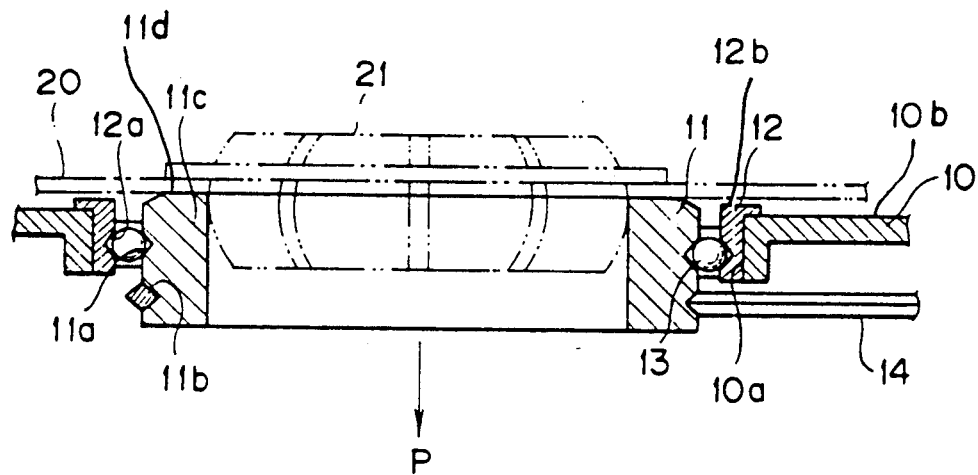
FIG. 2 is a cross-sectional view showing an embodiment of a disc driving unit according to the present invention.

FIG. 2 shows a magnetic disc driving unit used in a magnetic disc apparatus as a first embodiment of the present invention. Reference numeral 11 in FIG. 2 denotes a spindle having a top mounting surface 11d and a race surface 11a formed around its upper circumference for holding balls of a bearing. That is, the spindle 11 itself forms an inner ring of the bearing.

An outer ring 12 of the bearing is disposed outside the spindle 11 via balls 13. An inside circumference of the outer ring 12 is formed with a race surface 12a to hold the balls 13. The outer ring 12 is fixed by press fitting against or adhering to a circular opening 10a formed on a base 10 of the unit and having a flange on its inner edge.

The spindle 11 is higher than the outer ring 12. However, in contrast to the prior art arrangement of FIG. 1, as can be seen in FIG. 2, the mounting surface 11d is substantially coplanar with the upper surface 12b of the outer ring 12 and the upper surface 10b of the base 10. The shape, arrangement and dimensions of the internal and external diameters of a portion of the spindle 11 which is above the upper surface 12b of the outer ring 12 and upper surface 10b of the base 10 are determined so as to correspond respectively with those of the upper portion of the conventional spindle 2 (see FIG. 1). That is, in this embodiment, a radius of the inner ring is greater than a radius of the center cone 21.

When a magnetic disc 20 is clamped on the top mounting surface 11d of the spindle 11, a center cone 21 applies a predetermined pressure P to the magnetic disc 20 on an upper surface 11c of the spindle 11 so that the magnetic disc 20 is clamped.

A lower portion of the center cone 21 penetrates inside the spindle 11 and does not protrude below the spindle 11.

A portion of the spindle 11 below the lower edge of the outer ring 12 and the lower surface of the flange on the base 10, that is the external circumference of a lower portion of the race surface 11a is formed with a groove 11b that has a V-shaped cross section. A V-belt 14 which is wound on a pulley attached to a drive shaft of a motor (not shown) winds through the groove 11b. Then, the rotation of the motor rotates the inner ring 11c through the V-belt 14.

In this embodiment, then, the spindle 11 is formed integrally of the portion which is the inner ring of the bearing and the portion that is the pulley.

When the spindle 11 is rotated by the V-belt 14, if the magnetic disc 20 is not clamped the balls 13 are not subject to pressure and are free, so that there are no particular restrictions on the rotational accuracy of the spindle 11. On the other hand, when the magnetic disc is clamped, that is when the magnetic disc apparatus is operating and writing or reading data, the center cone 21 applies a pressure P to the spindle 11 so that the balls 13 are subjected to pressure, eliminating the gap in the diametrical direction and maintaining the predetermined rotational accuracy.

In this embodiment, the spindle 11 has the inner ring of the bearing and the pulley in an integrated arrangement so that far fewer components are required that in a conventional arrangement. Consequently, the assembly process can be much simplified and the errors during assembly can be reduced significantly.

Furthermore, since the rotational accuracy during operation depends only on the accuracy of the bearing, a high rotational accuracy is obtained by securing the accuracy of the bearing. Moreover, the thickness of the spindle represents the thickness of the overall unit so that it is possible to obtain a slim design.

In the above arrangement, the V-belt winds around the outer circumference of the spindle 11 below the base 10. It is also possible to wind the belt above the base 10 by making the upper portion of the spindle 11 protrude higher that the upper surface of the base 10. A flat belt can also be used instead of the V-belt 14.

Figure 3:
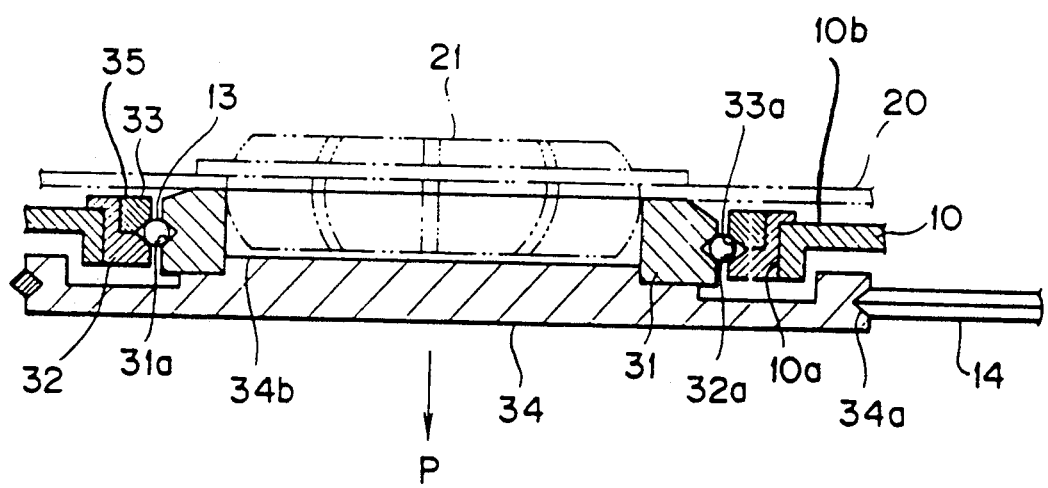
FIG. 3 is a cross-sectional view showing another embodiment of a disc driving unit according to the present invention.

FIG. 3 shows a second embodiment of the present invention. No explanation will be made of the reference numerals in FIG. 3 which denote the same parts as in FIG. 2.

In this embodiment, a spindle and a pulley are not formed integrally, but are arranged in an integral structure after being manufactured individually.

A outer ring of a bearing has a ball supporting member 32 and a holding member 33 which holds the balls. Butt portions of these members 32 and 33 are formed into tapered surfaces 32a and 33a, respectively, so as to form a V-shaped groove.

After the balls 13 are disposed between the tapered surface 32a of the support member 32 and a race surface 31a of a spindle 31, they are held in place by the holding member 33 which is engaged on the inner side of the supporting member 32.

The holding member 33 can be fixed either by press fitting, adhesion, by cutting an internal thread and an external thread on the supporting member 32 and the holding member 33, respectively, and screwing the holding member 33 in the supporting member 32, or by cutting screw threads on the members 32 and 33 and screwing a screw in the threads.

Figure 1:
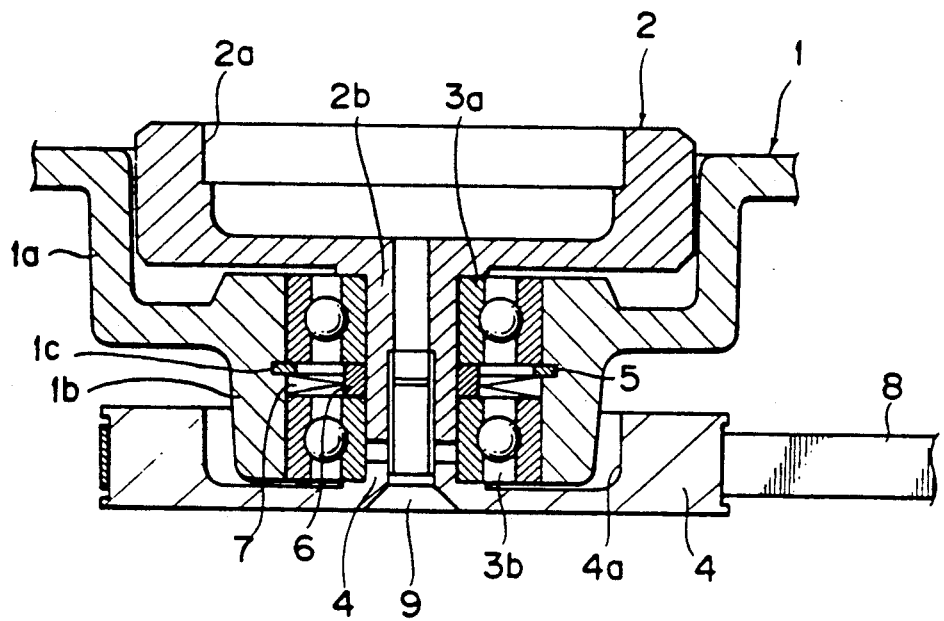
FIG. 1 is a cross-sectional view showing an example of a conventional disc driving unit.

Again, in contrast to the prior art arrangement of FIG. 1, the mounting surface 31b is substantially coplanar with the upper surface 35 of the holding member 33 and the upper surface 10b of the base 10.

Reference numeral 34 denotes a pulley. The pulley 34 is fixed by press fitting a protrusion 34b formed in its center to the inner side of the spindle 31. Adhesion or a screw can also be used to fix the pulley 34.

The pulley 34 has a V-shaped groove 34a around its external circumference. The V-belt 14 is stretched through this groove. The height of the spindle 31 is determined so that the lower edge of the center cone 21 does not touch the protrusion 34b on the pulley 34.

The second embodiment of the present invention in which the spindle and the pulley are manufactured individually and then arranged in an integrated structure offers the same advantages as the first embodiment explained above.

Figure 4:
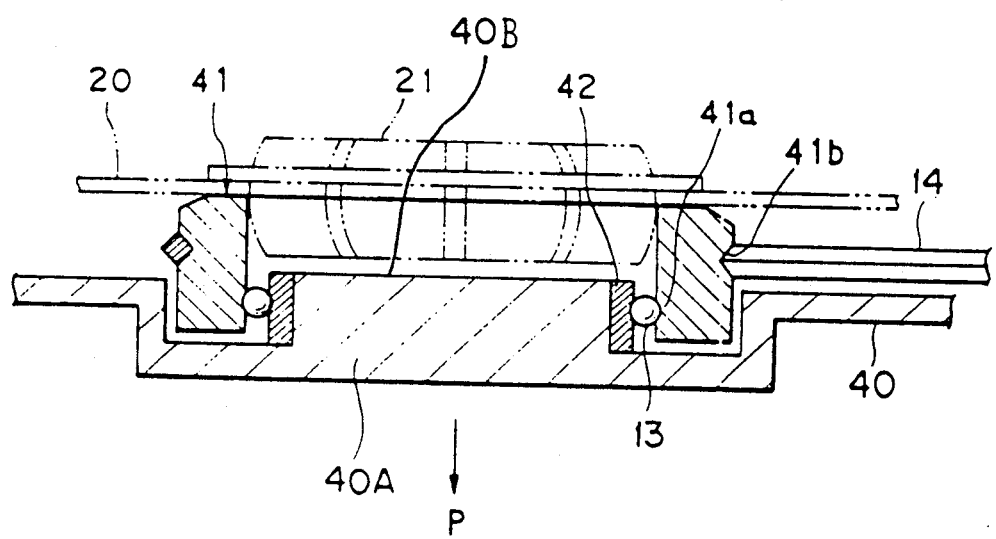
FIG. 4 is a cross-sectional view showing a still further embodiment of a disc driving unit according to the present invention.

FIG. 4 shows a third embodiment of the present invention. In this embodiment, an outer ring of a bearing, a spindle and a pulley are arranged integrally. That is, a spindle 41 has a portion 41a that forms the outer ring, and is arranged so that the shape, construction and dimensions such as the inner and outer diameters of the upper end portion correspond to those of the upper end portion of the spindle 2 in the conventional arrangement. In this embodiment, a radius of the outer ring is substantially equal to a radius of the center cone.

Again, in contrast to the conventional apparatus of FIG. 1, the upper surface 40B of the base or chassis 40 and the portion 41a at which the spindle 41 is supported by the chassis 40 via ball bearings 13 are substantially coplanar.

The outer circumference of the spindle 41 is formed with a groove 41b and a V-belt 14 is wound through the groove 41b. An inner ring 42 is fixed to a supporting portion 40A disposed protrudingly from a base or chassis 40. The arrangement of the third embodiment offers the same advantages as the embodiment shown in FIG. 2.

In the above embodiments, ball bearings are used as the bearings, but other bearings such as roller bearings can also be used.

The disc driving unit according to the present invention as explained above in which the pulley and the inner ring or the outer ring of the bearing are arranged integrally in the spindle is not limited to a magnetic disc driving unit in a magnetic disc apparatus, but can also be used widely in disc driving units for various types of discs such as, for example, an optical disc driving unit of an optical disc unit for performing recording and/or reproducing using an optical disc as an optical recording medium.

As explained above, the disc driving unit according to the present invention has an arrangement in which the pulley and the inner ring or the outer ring of the bearing are integrated in the spindle, so that both the number of components and of assembly steps are greatly reduced, thereby significantly reducing manufacturing costs and lowering the error during assembly to produce a high rotational accuracy.

Furthermore, in the present invention, the bearing is disposed on the inside or outside of the spindle, so that the spindle and the bearings are substantially in the same horizontal plane. This makes it possible to obtain high rotational accuracy and planarity of the spindle and of disc members loaded on this spindle. Moreover, this arrangement allows for a very low overall height of the driving apparatus, so that a slim unit can be obtained.

What is claimed is:

1. A disc apparatus comprising:
   a retaining base;
   a spindle for rotating a disc-shaped recording medium, said spindle having a mounting surface for mounting the recording medium thereon;
   a bearing;
   a holder holding said bearing on said retaining base, said bearing having means for rotatably supporting said spindle with respect to said retaining base; and
   clamping means for clamping the disc-shaped recording medium to said spindle, said retaining base and said holder being bounded by respective upper surfaces thereof which are substantially coplanar with respect to each other and said mounting surface, said bearing being a single bearing which supports said spindle only at a position which is in a vicinity of said mounting surface.

2. A disc apparatus as claimed in claim 1, wherein said retaining base has an open or recessed portion, said spindle being housed in the open or recessed portion.

3. A disc apparatus as claimed in claim 2, wherein said holder is disposed in said open or recessed portion in opposing relationship with respect to a side surface of said spindle, and said bearing is disposed in a space defined between opposing surfaces of said spindle and said holder.

4. A disc apparatus as claimed in claim 2, further comprising a belt pulley integral with said spindle, for transmitting a rotational driving force to said spindle.

5. A disc applaratus comprising:
   a retaining base;
   a spindle for rotating a disc-shaped recording medium, said spindle having a mounting surface for mounting the recording medium thereon;
   a bearing;
   a holder holding said bearing on said retaining base, said bearing having means for retaining said spindle on said base so that said spindle is rotatable with respect to said retaining base; and
   clamping means for clamping said disc-shaped recording medium to said spindle, wherein said retaining base and said holder are bounded by respective upper surfaces thereof which are substantially coplanar with respect to each other and said mounting surface, and said bearing is a single bearing which supports an outer periphery of said spindle in a vicinity of said mounting surface.

6. A disc apparatus as claimed in claim 5, wherein said retaining base has an open or recessed portion, said spindle being housed in the open or recessed portion.

7. A disc apparatus as claimed in claim 6, wherein said holder is disposed in said open or recessed portion in opposing relationship with respect to a side surface of said spindle, and said bearing is disposed in a space defined between opposing surfaces of said spindle and said holder.

8. A disc apparatus as claimed in claim 6, further comprising a belt pulley integral with said spindle, for transmitting a rotation driving force to said spindle.

9. A disc apparatus for rotating a disc-shaped recording medium, comprising:
   a chassis having an upper surface and an open or recessed portion extending downwardly from said upper surface; said recessed portion having a peripheral surface
   a spindle, having a mounting surface for rotatably supporting the recording medium on said mounting surface, said spindle being inserted into said open or recessed portion, said spindle and said peripheral surface defining a space therebetween; and
   a bearing disposed in said space, said bearing being a single bearing supported by said chassis at said peripheral surface and supporting a periphery of said spindle only at a predetermined position in a vicinity of said mounting surface;
   wherein said upper surface of said chassis and said predetermined position are substantially coplanar.

10. A disc apparatus as claimed in claim 9, wherein said peripheral surface of said open or recessed portion and said periphery of said spindle are in opposing relationship with each other and define race surfaces of said bearing, said bearing comprising interposed between the race surfaces.

11. A disc apparatus as claimed in claim 9, further comprising a belt pulley integral with said spindle, for transmitting a rotational driving force to said spindle.

* * * * *